3,106,455
PURIFICATION OF METAL CARBIDES
AND BORIDES
Robert L. Ripley, Lockport, N.Y., assignor to Union
Carbide Corporation, a corporation of New York
No Drawing. Filed Apr. 1, 1960, Ser. No. 19,154
10 Claims. (Cl. 23—204)

The present invention relates to a process for the purification of carbides and borides of refractory transition metals such as titanium, zirconium, hafnium, tantalum, vanadium and columbium, and carbides of boron.

The carbides and borides of titanium, zirconium, hafnium, tantalum, columbium, vanadium, and the carbides of boron, are commonly employed in industry as abrasive materials, as ingredients of hard alloys for cutting tools, and for other purposes. For many of these purposes, a product as free as possible from uncombined graphitic carbon is desired, carbon being normally an unwanted constituent of hard alloys and being considered a deleterious impurity.

Various methods of purification of carbides and borides of the above-mentioned metals have been suggested and tried without much success. For example, it is well known that certain impurities can be removed by employing froth flotation methods similar to those used in treating ores. Tests, however, soon demonstrated that these methods were completely ineffectual in removing the uncombined carbon contained in the carbides and borides of the above-mentioned metals.

Another method which was attempted was elutriation, but, again, the removal of uncombined graphite from the carbide or boride was not successful.

A third method, which has been found to be only partially effective, consists in forming an aqueous suspension of the impure carbide or boride with the addition of tannic acid as a deflocculating agent, allowing this suspension to settle and then pouring off the supernatant liquor. This process may be repeated a number of times, but the difficulty resides in the high losses encountered, because while a substantial percentage of the uncombined carbon is removed with the decanted liquor, about 20 percent of the carbide or boride present as fine particles is also removed and lost.

Other methods employed for the removal of uncombined graphitic carbon are based on the incorporation of certain predetermined quantities of tungsten metal or of manganese metal. However, the metal product obtained is either contaminated by the presence of a hard tungsten carbide or by the often undesirable presence of manganese metals in amounts of several tenths of a percent.

It is, accordingly, an object of the present invention to provide a process for the removal of the uncombined graphitic carbon from the carbides and borides of the above-mentioned metals, so that the resulting purified product is substantially free from uncombined graphite.

Other objects and advantages of the present invention will be apparent from a description thereof and from the appended claims.

The process which satisfies the objects of the present invention comprises heating at least one graphitic carbon-contaminated material selected from the group consisting of carbides and borides of titanium, zirconium, hafnium, tantalum, columbium, vanadium, and carbides of boron, with elemental calcium to temperatures of between about 1200° C. and about 1450° C., so as to cause the uncombined graphitic carbon to react with the elemental calcium with the formation of calcium carbide and, subsequently, decomposing the calcium carbide formed by treating the product with an acid.

The elemental calcium should be employed in excess rather than stoichiometric quantities so as to insure a substantially complete removal of the uncombined graphitic carbon present in the metal carbide or boride.

A minimum operable ratio of elemental calcium to uncombined graphite consists of approximately one-half mole of calcium per mole of available uncombined graphite. Excesses of calcium, however, are preferred; for example, a 10 to 20 percent molar excess has been found quite satisfactory.

The refractory metal reactants of the process are preferably employed in comminuted particle size, in order to render the purification operation easier and more complete. Particle sizes of metal carbide or boride of the order of about 325 mesh have been found to be extremely satisfactory.

Since the calcium metal reacts with the uncombined graphite contained in the metal carbide or boride, the reaction temperature employable is substantially the same in every case, regardless of the compound involved. Operable temperatures lie in the range of from about 1200° C. to about 1450° C., depending on the amount of uncombined graphite which it is permissible to leave in the product and on the degree of comminution of the reactants.

The high reactivity of elemental calcium, coupled with the ease with which it can be removed by leaching from the final product, render this carbon absorber highly preferable to any other known material in the instant process.

The leaching of the final product to remove therefrom the by-product carbide of calcium may be carried out by employing any suitable reagent capable of dissolving calcium and calcium carbide without substantial dissolution of the desired carbide or boride. For example, dilute aqueous solutions of acids such as hydrochloric have been found satisfactory.

The purification process may be carried out, for example, by placing in a suitable reaction vessel the proper amount of calcium, preferably in a ratio with uncombined graphite as stated above, and by placing over this layer of calcium the comminuted metal carbide or boride to be purified. The reaction zone is then evacuated of any chemically reactive atmosphere or, if this is not possible because of the equipment employed, the comminuted metal carbide or boride is covered with a layer of an oxygen-getting substance in an amount sufficient to prevent the metal carbide or boride from becoming contaminated by oxygen. Typical examples of such oxygen-getting substances are, for instance, calcium carbide or the metal whose carbide or boride is being purified, or a mixture thereof.

For example, in the case of titanium carbide purification, the distribution of the materials in the reaction vessel could consist of a layer of calcium metal topped by a layer of comminuted titanium carbide, this being optionally covered by either a layer of granular calcium carbide or by a layer of comminuted titanium metal in the form of fines or turnings, or by a mixture thereof.

The following are specific examples to better illustrate the scope of the invention. These examples, however, should not be construed as limitative upon the type of metal carbide or boride amenable to purification according to the method of the instant invention.

*Example 1*

In a stainless steel crucible, 10.5 grams of comminuted titanium carbide, analyzing 6.37 percent uncombined graphite by weight, were placed on top of 5.25 grams of high-purity comminuted calcium metal. The crucible was heated to 1250° C. in an argon atmosphere and maintained at this temperature for one hour. After cooling, 400 milliliters of water and 45 milliliters of 12 N hydrochloric acid were mixed with the product and digested at room temperature for three hours. The product was filtered, washed with water and the solids were dried. An analysis of the purified titanium carbide showed that only 0.04 percent by weight uncombined graphitic carbon was left in the product.

*Example II*

In a stainless steel crucible, 10 grams of titanium diboride powder, analyzing 0.40 percent uncombined graphite by weight, were placed on top of 5.0 grams of high-purity comminuted calcium metal. The crucible was heated to 1250° C. in an argon atmosphere and maintained at this temperature for one hour. After cooling, 400 milliliters of water and 45 milliliters of 12 N hydrochloric acid were mixed with the product and digested at room temperature for three hours. The product was filtered, washed with water and the solids were dried. An analysis of the purified titanium diboride showed that only about 0.10 percent by weight uncombined graphitic carbon was left in the product.

What is claimed is:

1. A process for the removal of uncombined graphitic carbon from carbides and borides of refractory transition metals, which comprises heating at least one graphitic carbon-contaminated material selected from the group consisting of carbides and borides of titanium, zirconium, hafnium, tantalum, columbium, vanadium, and carbides of boron with calcium to temperatures of between about 1200° C. and about 1450° C., so as to cause the uncombined graphite carbon to react with the elemental calcium with formation of calcium carbide; thereafter leaching the reaction product with acid to dissolve contained calcium carbide and recovering the remaining graphite depleted product.

2. The process in accordance with claim 1 in which the metal carbide and boride are comminuted to a particle size of at least 325 mesh prior to heating.

3. The process in accordance with claim 1 in which the reaction between the elemental calcium and the metal carbide and boride is carried out in a chemically-unreactive atmosphere.

4. The process in accordance with claim 1 in which the amount of elemental calcium employed is from about 10 to about 20 percent in excess of the stoichiometric amount necessary to react said elemental calcium with the uncombined graphite combined in the metal carbide and boride.

5. A process for the removal of uncombined graphitic carbon from carbides and borides of refractory transition metals, which comprises heating at least one finely-divided graphitic carbon-contaminated material selected from the group consisting of carbides and borides of titanium, zirconium, hafnium, tantalum, columbium, vanadium, and carbides of boron with elemental calcium in a chemically-unreactive atmosphere to temperatures of between about 1200° C. and about 1450° C., said elemental calcium being from about 10 percent to about 20 percent in excess of the stoichiometric amount necessary to react with the uncombined graphite in the metal carbide and boride, so as to cause the uncombined graphitic carbon to react with the elemental calcium with formation of calcium carbide; thereafter leaching the reaction product with an aqueous acid solution to dissolve contained calcium and calcium carbide and recovering the remaining graphite depleted materials.

6. A process for the removal of uncombined graphitic carbon from titanium carbide, which comprises heating titanium carbide with elemental calcium to 1250° C., so as to cause the uncombined graphitic carbon to react with the elemental calcium with formation of calcium carbide thereafter leaching the reaction product with an aqueous hydrogen chloride solution to dissolve contained calcium and calcium carbide and recovering the remaining graphite depleted product.

7. The process in accordance with claim 6 in which said titanium carbide is comminuted to a particle size of at least 325 mesh prior to heating, and said heating is effected under chemically-unreactive atmosphere.

8. A process for the removal of uncombined, graphitic carbon from titanium diboride, which comprises heating the crude titanium diboride with elemental calcium to 1250° C., so as to cause the uncombined graphitic carbon to react with the elemental calcium with formation of calcium carbide, thereafter leaching the reaction product with an aqueous hydrogen chloride solution to dissolve contained calcium and calcium carbide and recovering the remaining graphite depleted product.

9. The process in accordance with claim 8 in which said titanium diboride is comminuted to a particle size of at least 325 mesh prior to heating, and said heating is effected under chemically-unreactive atmosphere.

10. A process for the removal of uncombined graphite carbon from carbides and borides of refractory transition metals selected from the group consisting of carbides and borides of titanium, zirconium, hafnium, tantalum, columbium, vanadium and carbides of boron, said process comprising placing a layer of the material to be purified in comminuted form over a layer of calcium metal, heating the materials at a temperature between about 1200° C. to 1450° C. to cause the uncombined graphitic carbon to react with elemental calcium with the formation of calcium carbide; thereafter leaching the reaction product with acid to dissolve contained calcium and calcium carbide and recovering the remaining graphite-depleted solid material.

References Cited in the file of this patent

UNITED STATES PATENTS

| 596,999 | Hewes | Jan. 11, 1898 |
| 1,792,943 | Terry | Feb. 17, 1931 |
| 2,204,501 | Krauss | June 11, 1940 |
| 2,310,964 | Laughlin | Feb. 16, 1943 |
| 2,913,312 | Dubeck | Nov. 17, 1959 |

FOREIGN PATENTS

| 473,510 | Great Britain | Oct. 14, 1937 |

OTHER REFERENCES

Mellor: "A Comprehensive Treatise on Inorg. and Theo. Chem.," vol. 5, 1924 ed., page 845, Longmans, Green and Co., N.Y.